J. D. MURPHY.
WROUGHT AND CAST IRON WHEELS.
No. 47,780. Patented May 16, 1865.
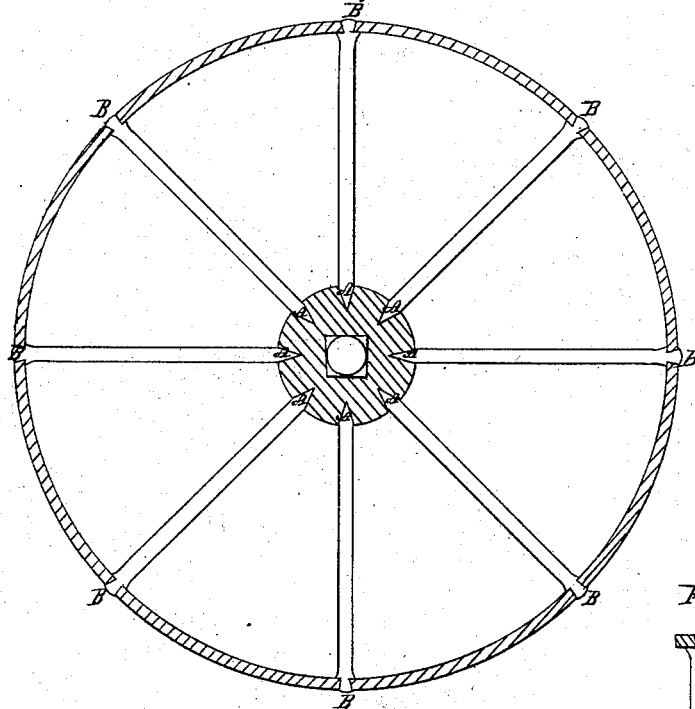
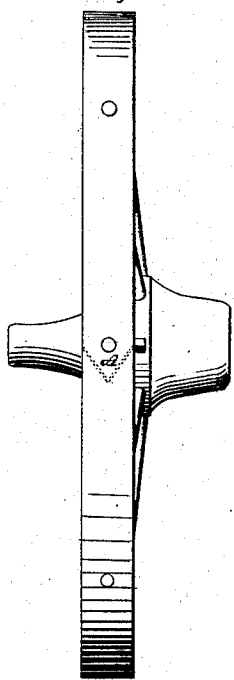
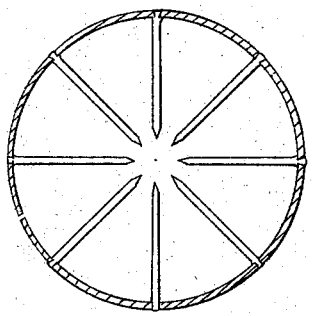
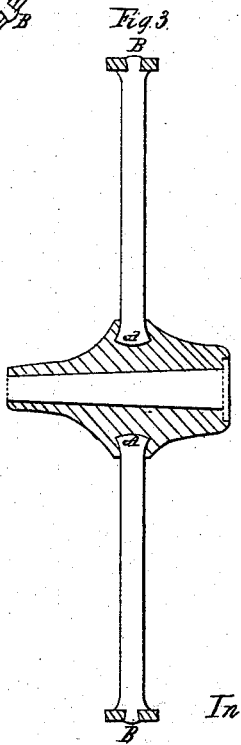

UNITED STATES PATENT OFFICE.

JOHN D. MURPHY, OF BALTIMORE, MARYLAND.

IMPROVEMENT IN THE MANUFACTURE OF RAILROAD-CAR WHEELS.

Specification forming part of Letters Patent No. 47,780, dated May 16, 1865.

*To all whom it may concern:*

Be it known that I, JOHN D. MURPHY, a citizen of the United States, and a resident of Baltimore city, in the State of Maryland, have invented new and useful improvements in the mode of making combined wrought and cast iron wheels for carriages, wagons, railroad-cars, gun-carriages, and for whatever purposes to which wheels are applicable; and I do hereby declare that the following is a full and exact description thereof, reference being had to the accompanying drawings, and to the letters of reference marked thereon.

To enable others skilled in the art to make and use my invention, I will proceed to describe it entire.

The following is the mode of manufacture:

First. After the spokes are cut to the required length, I then proceed to flatten and spread them at one end, so as not only to give to them a more extended bearing-surface in the cast metal or hub, but at the same time to give them the great advantage of a dovetail form, as shown on plan at A in Figs. 1 and 3. On the other end is then formed what is also herein claimed, the shoulder and dowel, which in a heated state, is to be riveted into the conical or tapered cavity prepared to receive it in the rim or tire before the hub is cast, (at B in Figs. 1 and 3.) The object of this form of rivet is not only to furnish one that will bear the wear of rim or tire without failing to be a rivet, but at the same time that will by the process of wearing rivet itself. The riveting of the spokes is so performed as to give to the wheel whatever dish may be required. The tire being left open at the V weld, as shown at A, Fig. 2, the skeleton is then ready for the mold. (See Fig. 4.)

Second. To prevent the possibility of failure in the amalgamation of the two metals, reservoirs are formed in the mold, one on each side, or more, if required, to receive the surplus metal used in heating the spokes, placed and constructed with small gates, so as to fill very slowly, thereby giving not only time, but also a constant flow of fresh hot metal to heat the spokes. The gates to those chambers or reservoirs are so placed that the wrought-iron or spokes are not covered until thoroughly heated, thus allowing the gases produced by the combination of the two metals to pass off without rising through the upper metal, which would otherwise leave the hub porous and full of small cavities.

Having described my improvements, I wish to be distinctly understood as claiming nothing herein that has been previously secured to me by Letters Patent; but What I do claim, and desire to secure by Letters Patent, is—

1. Constructing the rim or tread and the spokes of wrought-iron and attaching the same to each other before the hub is cast by riveting the spokes when hot to the rim and casting the hub around the flattened and expanded opposite ends of the spokes, substantially as set forth.

2. Pouring a stream of melted metal over the flattened and expanded ends of the spokes, and permitting it to pass freely away from them until said expanded ends shall have attained to a high degree of heat, and then allowing the mold to fill and the metals to unite with each other, substantially as specified.

JOHN D. MURPHY.

Witnesses:
JOHN D. BLOOR,
JOHN S. HOLLINGSHEAD